(12) United States Patent
Cayre et al.

(10) Patent No.: US 7,707,834 B2
(45) Date of Patent: May 4, 2010

(54) DIFFUSER FOR AN ANNULAR COMBUSTION CHAMBER, IN PARTICULAR FOR AN AIRPLANE TURBINE ENGINE

(75) Inventors: Alain Cayre, Pamfou (FR); Luc Henri Claude Daguenet, Corbeil Essonnes (FR); Claude Gautier, Savigny le Temple (FR); Christophe Pieussergues, Nangis (FR); Stephane Henri Guy Touchaud, Vincennes (FR)

(73) Assignee: SNECMA, Paris (FR)

( * ) Notice: Subject to any disclaimer, the term of this patent is extended or adjusted under 35 U.S.C. 154(b) by 637 days.

(21) Appl. No.: 11/315,360

(22) Filed: Dec. 23, 2005

(65) Prior Publication Data
US 2006/0162336 A1 Jul. 27, 2006

(30) Foreign Application Priority Data
Jan. 6, 2005 (FR) .................................. 05 00098

(51) Int. Cl.
*F02C 1/00* (2006.01)
(52) U.S. Cl. .......................................... 60/751; 60/760
(58) Field of Classification Search ............ 60/751–760
See application file for complete search history.

(56) References Cited

U.S. PATENT DOCUMENTS

| 4,380,895 A | * | 4/1983 | Adkins ...................... 60/39.23 |
| 4,458,479 A | * | 7/1984 | Reider et al. .................. 60/800 |
| 5,211,003 A | | 5/1993 | Samuel |
| 5,901,548 A | * | 5/1999 | Coffinberry ................... 60/776 |
| 6,286,317 B1 | * | 9/2001 | Burrus et al. .................. 60/752 |
| 6,334,297 B1 | * | 1/2002 | Dailey et al. ................... 60/785 |
| 6,651,439 B2 | * | 11/2003 | Al-Roub et al. ................ 60/772 |
| 2002/0174657 A1 | * | 11/2002 | Rice et al. ...................... 60/746 |
| 2003/0141388 A1 | * | 7/2003 | Johnson et al. ............. 239/550 |
| 2004/0244379 A1 | * | 12/2004 | Walker et al. .................. 60/751 |

FOREIGN PATENT DOCUMENTS

GB  589030  6/1947

OTHER PUBLICATIONS

U.S. Appl. No. 12/199,182, filed Aug. 27, 2008, Pieussergues, et al.

* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, L.L.P.

(57) ABSTRACT

A diffuser for a single-head annular combustion chamber of an airplane engine, the diffuser comprising a separator formed by a thin sheet connected by structural arms to inner and outer circularly-symmetrical walls of the diffuser, the diffuser angle for each diffusion stream defined by the separator lying in the range about 12° to about 13°.

17 Claims, 2 Drawing Sheets

DIFFUSER FOR AN ANNULAR COMBUSTION CHAMBER, IN PARTICULAR FOR AN AIRPLANE TURBINE ENGINE

The invention relates to a diffuser for an annular combustion chamber, in particular for an airplane engine such as a turbojet or a turboprop, the diffuser comprising a separator for splitting the flow of air leaving a compressor into two annular diffusion streams feeding the combustion chamber.

BACKGROUND OF THE INVENTION

A diffuser of that type is already known for feeding a double-headed combustion chamber, i.e. a combustion chamber having two concentric annular sets of fuel injectors. The separator comprises two circularly symmetrical surfaces of revolution that diverge downstream away from the inlet to the diffuser. That structure has a very open configuration and is for engines of large size. It is not suitable for feeding a single-head combustion chamber, in particular for an engine of relatively small size.

A diffuser is also known comprising two coaxial separators arranged one around the other to split the flow of air leaving the compressor into three coaxial annular streams, with the middle stream feeding the combustion chamber while the streams situated radially inside and radially outside the middle stream feed circuits for bypassing the combustion chamber, for cooling the walls thereof, and the walls of a turbine arranged at the outlet from the combustion chamber. That known diffuser is designed for an engine of large size and is not suitable for use in an engine of relatively small size.

OBJECTS AND SUMMARY OF THE INVENTION

An object of the present invention is to provide a diffuser with a separator that is compact so as to be suitable for use in an engine of size that is relatively smaller than in the prior art, and that makes it possible to split optimally the flow of air leaving the compressor into two diffusion streams feeding a single-head combustion chamber, minimizing head losses, optimizing the distribution of feed and cooling flow rates to the chamber, and minimizing the disturbances caused by any extraction of airplane air from the end of the combustion chamber.

To this end, the invention provides a diffuser for a single-head annular combustion chamber, in particular for an airplane turboprop, the diffuser comprising a separator splitting the flow of air leaving a compressor into two annular diffuser streams, the separator being formed by a thin sheet connected by structural arms to inner and outer circularly-symmetrical walls of the diffuser, wherein the diffuser angle of each diffusion stream defined by said thin sheet in the diffuser is about 12° to 13°, and wherein the fuel injectors in the combustion chamber are in line with the downstream end portion of the thin sheet forming the separator and are oriented relative to the longitudinal axis of the combustion chamber substantially in the same manner as said downstream end portion.

The essential advantage of the diffuser of the invention is to enable the flow of air leaving the compressor to be slowed down to a maximum extent over a short distance while guaranteeing a flow that is sound and stable, i.e. without separation. The duplicated diffuser angles of the diffuser enable the length of the diffuser to be shortened and enable the weight of the engine to be reduced.

The outer diffusion stream feeds a portion of the system for injecting fuel into the combustion chamber, and also feeds an outer bypass circuit around the combustion chamber, and possibly feeds a circuit for extracting air for the requirements of the airplane, while the inner diffusion stream feeds a portion of the fuel injection system in the combustion chamber, and also feeds a bypass circuit mounted internally relative to the combustion chamber.

The thin sheet is preferably streamlined in longitudinal section in order to reduce harmful turbulence and wake downstream therefrom and in order to improve the feed to the end of the combustion chamber.

The structural arms connecting the thin sheet forming the separator to the inner and outer circularly-symmetrical walls of the diffuser may also have a function of straightening out the flow leaving the compressor.

These structural arms may also be streamlined in longitudinal section to reduce head losses in the diffuser.

Flow straighteners may be arranged at the outlet from the compressor and the inlet to the diffuser, and they may optionally be formed in an upstream extension of the circularly-symmetrical walls of the diffuser.

Preferably, the diffuser of the invention includes a setback situated between the downstream end of the inner circularly-symmetrical wall of the diffuser and an inner support wall, and/or a setback situated between the downstream end of the outer circularly-symmetrical wall of the diffuser and an outer support wall, said setbacks forming stable air recirculation zones, thereby having the effect of making the diffuser less sensitive to non-uniformities in the flow of air leaving the compressor.

In general, the short length of the diffuser of the invention associated with the large amount of diffusion it provides enables a single-head combustion chamber to be fed properly in an engine having dimensions that are smaller than in the prior art, the diffuser is capable of accommodating aerodynamic conditions at its inlet that are non-uniform over the height of the stream, it is capable of limiting the disturbances caused by airplane air being taken from the end of the combustion chamber, and it guarantees low combustion chamber head losses and thus better efficiency and reduced fuel consumption by the engine.

The invention also provides a single-head combustion chamber, in particular for an airplane turboprop, the combustion chamber including a diffuser as described above.

The invention also provides an airplane turboprop, including a diffuser as described above.

BRIEF DESCRIPTION OF THE DRAWINGS

The invention can be better understood and other characteristics, details, and advantages thereof appear more clearly on reading the following description made by way of non-limiting example and with reference to the accompanying drawings, in which.

MORE DETAILED DESCRIPTION

Figure 1:
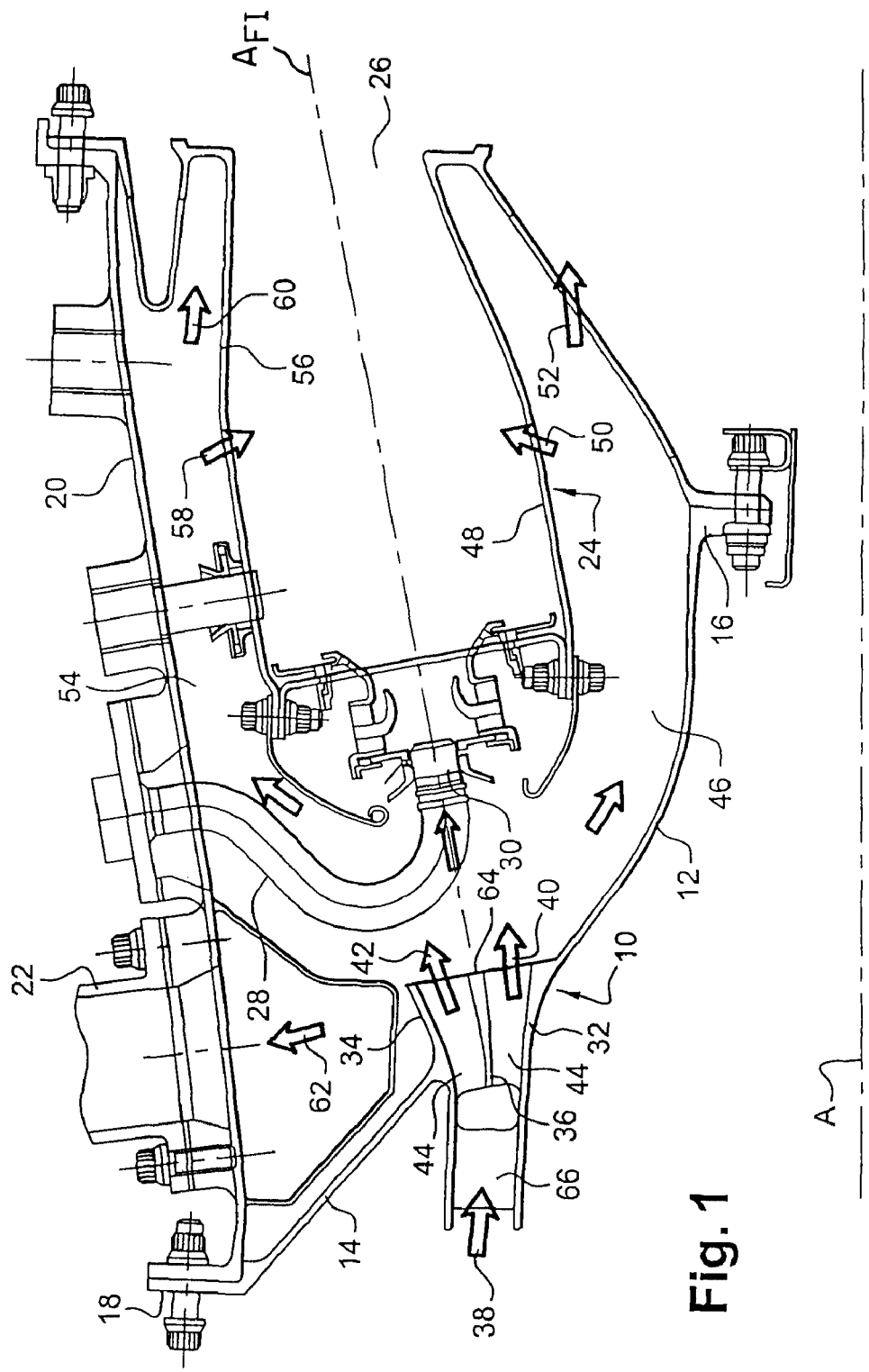
FIG. 1 is a fragmentary diagrammatic half-view in axial section of a diffuser of the invention together with a single-head combustion chamber.

In the drawings, the left-hand side is upstream or towards the front and the right-hand side is downstream or towards the rear.

In FIG. 1, the diffuser 10 of the invention is arranged at the outlet from a compressor (not shown), and it is supported by an inner wall 12 and an outer wall 14 that are secured by flanges 16 and 18 respectively to an inner turbine casing and to an outer turbine casing 20 including at least one duct 22 for taking airplane air (air for pressurizing the cabin, air for de-icing the engine pod, etc.) which opens out upstream from a combustion chamber 24 of annular shape that is fed with air by the diffuser 10 and that itself feeds a high pressure turbine (not shown) arranged downstream from the outlet 26 of the combustion chamber.

The outer casing 20 also carries ducts 28 for feeding fuel to injectors 30 that are distributed around a circumference about the longitudinal axis A of the combustion chamber 24 and of the engine.

The diffuser 10 has an inner circularly-symmetrical wall 32 surrounded by an outer circularly-symmetrical wall 34, and a thin sheet 36 constituting a separator which extends around the longitudinal axis A of the engine between the walls 32 and 34 and which splits the flow of air 38 leaving the compressor into two annular streams, namely an inner stream 40 and an outer stream 42. Structural arms 44 extend radially between the thin sheet 36 and the circularly-symmetrical walls 32 and 34 in order to hold the thin sheet 36 and transmit forces in the diffuser.

The fuel injectors 30 in the combustion chamber, each have a central axis $A_{F1}$, are in line with the downstream end of the thin sheet 36 and they have the same orientation as said downstream end relative to the longitudinal axis A of the engine.

The inner and outer streams formed between the thin sheet 36 and the inner and outer circularly-symmetrical walls 32 and 34 of the diffuser have diffuser angles that ensure that the air flow section increases at an increasing rate from the inlet to the outlet of the diffuser, the total diffuser angle of the diffuser 10 representing twice the optimum diffuser angle for a simple diffuser without a separator, thus making it possible to provide optimum diffusion of the air flow leaving the compressor over a shorter axial length.

The radially inner stream 40 leaving the diffuser 10 feeds the injection system formed by the injectors 30 in the combustion chamber and an inner annular channel 46 that bypasses the combustion chamber 24, this inner channel being formed between the inner wall 12 for supporting the diffuser 10 and a corresponding annular wall 48 of the combustion chamber 24 and opening out downstream towards an inner circuit for cooling the turbine. The portion of the diffusion stream 40 that passes in the channel 46 is split between a flow 50 penetrating into the chamber 24 via orifices through the inner annular wall 48, and a flow 52 directed towards the inner cooling circuit of the turbine.

The radially outer stream 42 serves in part to feed the injection system of the combustion chamber 24 and in part feed an annular channel 54 bypassing the combustion chamber 24 on the outside, said channel 54 being formed between the outer casing 20 and an outer annular wall 56 of the combustion chamber. The air flowing in the channel 54 is split between a flow 58 penetrating into the chamber 24 via orifices in the outer annular wall 56, and a flow 60 feeding an outer cooling circuit of the turbine.

When the circuit for taking airplane air is activated, the extraction duct 22 is fed by the portion 62 of the outer stream 42 leaving the diffuser.

In the embodiment of FIG. 1, the thin annular sheet 36 forming the separator extends upstream substantially as far as the upstream edges of the structural arms 44 and downstream substantially as far as the downstream edges of the structural arms 44, and of the circularly-symmetrical walls 32 and 34 of the diffuser, terminating in a straight tip 64.

The circularly-symmetrical walls 32 and 34 of the diffusers are extended upstream beyond the annular sheet 34 and the structural arms 44 and are interconnected by substantially radial partitions 66 for straightening out (deswirling) the flow of air 38 leaving the last stage of the compressor.

Figure 2:
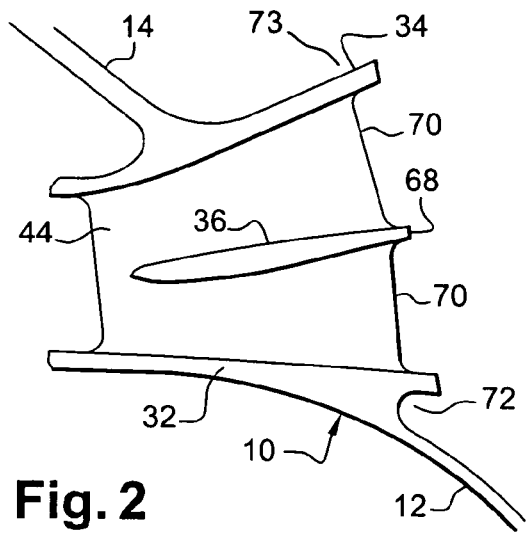
FIGS. 2 to 4 are fragmentary diagrammatic half-views in axial section showing various embodiments of the diffuser of the invention.

In the variant embodiment of FIG. 2, the circularly-symmetrical walls 32 and 34 of the diffuser 10 are downstream from flow-straighteners (not shown) and the upstream end of the sheet 36 is offset downstream from the upstream ends of the walls 32 and 34 and the upstream edges of the structural arms 44. The annular sheet 36 is streamlined to limit turbulence and wake behind its downstream end which is shaped to form a relatively thin trailing edge 68. The rear edges 70 of the structural arms 44 are located a short distance upstream from the rear edges of the circularly-symmetrical walls 32 and 34 and of the trailing edge 68 of the annular sheet 36, or else substantially in the same plane as said rear edges.

The diffuser 10 of FIG. 2 has a first setback 72 at the downstream end of the inner circularly-symmetrical wall 32 between said wall and the inner wall 12 for supporting the diffuser, and a second setback 73 at the downstream end of the outer circularly-symmetrical wall 34 between said wall and the outer wall 14 for supporting the diffuser.

These setbacks 72 and 73 provide zones for stable recirculation between the inner and outer walls 32 and 34 and the walls of the inner and outer casings 12 and 14, respectively, so as to improve insensitivity to variations in the pressure, temperature, and speed over its height of the stream at the inlet of the diffuser.

The structural arms 44 may themselves be streamlined so as to limit head losses in the diffuser. They may also form means for straightening the flow of air 38 leaving the last stage of the compressor.

Figure 3:
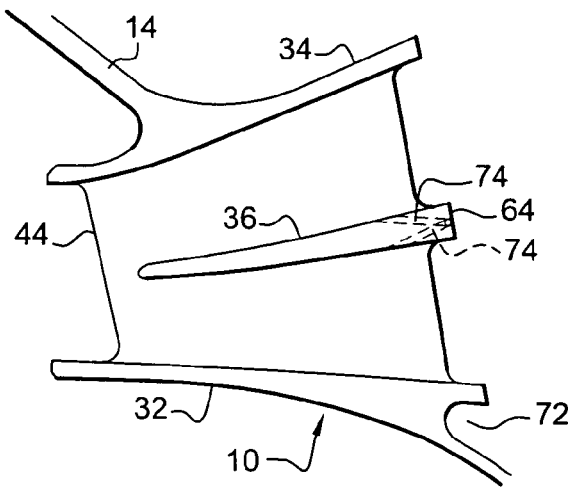

In the embodiment of FIG. 3, the diffuser 10 is substantially the same type as shown in FIG. 2, but the thin annular sheet 36 forming the separator is not streamlined and is terminated at its downstream end by a straight tip 64 in which holes 74 can be formed extending upstream and diffuser angle out in alternation into each of the two faces of the thin sheet 36.

The straight tip 64 generates a "dead" flow zone in which recirculation takes place with a pressure "deficit". It is also responsible for losses of pressure.

The holes 74 serve to equalize the pressures on the inner and outer faces of the separator 36 and on the tip 64, thereby limiting the above-mentioned harmful effects of the tip and delivering pressure to the flow behind the tip.

The holes are made in the rear periphery of the separator 36 at a determined circumferential pitch. The number and dimensions of said holes are determined so as to comply with constraints concerning manufacture of the separator.

Figure 4:
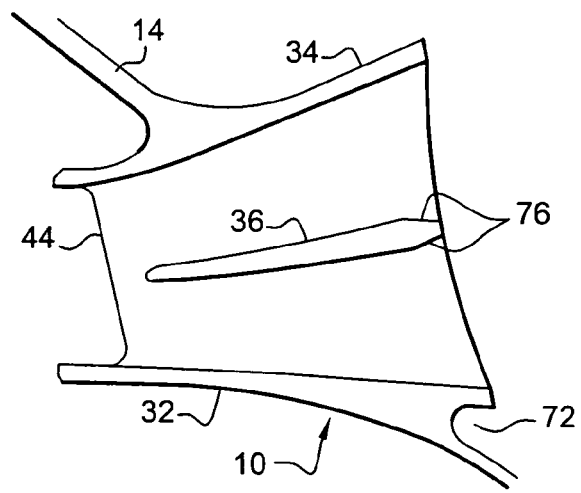

In the embodiment of FIG. 4, the diffuser 10 is substantially the same type as shown in FIG. 3, but the thin annular sheet 36 forming the separator terminates at its downstream end in a straight tip having peripheral chamfered edges 76 so as to restrict the air recirculation zone behind the tip and encourage the splitting of the diffusion streams 40 and 42 so that they become attached more quickly behind the tip.

The characteristics of the separator formed by the thin annular sheet 36 serve to provide greater robustness when faced with non-uniformities in the flow of air 38 leaving the compressor, i.e. to provide a flow without separation or recirculation, to provide good aerodynamic equilibrium between the two streams 40 and 42 leaving the diffuser, and to provide flows bypassing the combustion chamber that are less sensitive to non-uniformities in the flow of air 38. The performance of the combustion chamber is improved correspondingly. The separator also makes it possible to protect the inner stream 40 in the event of airplane air being taken off.

What is claimed is:

1. A diffuser for a single-head annular combustion chamber, the diffuser comprising:
   a separator configured to split the flow of air leaving a compressor into two annular diffusion streams, the separator being formed by a thin sheet connected by structural arms to inner and outer circularly-symmetrical walls of the diffuser,
   wherein a diffuser angle of each diffusion stream defined between said thin sheet in the diffuser and the inner and outer walls of the diffuser is about 12 degrees to 13 degrees,
   wherein a total diffuser angle defined by the inner and outer walls of the diffuser is substantially equal to the sum of the diffuser angles of the diffusion streams,
   wherein both annular diffusion streams exiting from the diffuser feed a single row of fuel injectors which are disposed on an extension of a surface defined by a downstream end portion of the separator and which are oriented relative to the longitudinal axis of the single-head annular combustion chamber substantially in the same manner as said downstream end portion of the separator, and
   wherein each fuel injector includes a central axis, and said central axis intersects the downstream end portion of the separator.

2. A diffuser according to claim 1, wherein the outer diffusion stream is configured to feed the fuel injection system of the single-head annular combustion chamber and a bypass circuit for bypassing the single-head annular combustion chamber on the outside of the single-head annular combustion chamber.

3. A diffuser according to claim 1, wherein the inner diffusion stream is configured to feed the fuel injection system of the single-head annular combustion chamber and a circuit for bypassing said single-head annular chamber on the inside.

4. A diffuser according to claim 1, wherein the thin sheet is of streamlined shape in longitudinal section.

5. A diffuser according to claim 1, wherein the thin sheet includes a tip at its downstream end, having holes formed therein and extending upstream to open out alternately in each of the faces of the thin sheet in order to balance pressures on either side of the separator and at the tip.

6. A diffuser according to claim 5, wherein the thin sheet includes a straight tip with chamfer edges at its downstream end in order to encourage the diffusion streams to split.

7. A diffuser according to claim 1, wherein the structural arms form flow straighteners configured to straighten out the air flow leaving the compressor.

8. A diffuser according to claim 1, wherein straighteners are arranged between upstream extensions of the inner and outer circularly-symmetrical walls of the diffuser.

9. A diffuser according to claim 1, wherein the structural arms are streamlined in order to reduce head losses in the diffuser.

10. A diffuser according to claim 1, including a setback situated between the downstream end of the inner circularly-symmetrical wall of the diffuser and an inner support wall, and a setback situated between the downstream end of the outer circularly-symmetrical wall of the diffuser and an outer support wall, said setbacks forming stable air recirculation zones at the outlet from the diffuser.

11. An airplane turboprop, including a diffuser according to claim 1.

12. A diffuser according to claim 2, wherein the outer diffusion stream is configured to feed an extraction duct.

13. A diffuser according to claim 1, wherein all of the fuel injectors are disposed at the same radial distance from the longitudinal axis of the single-head annular combustion chamber.

14. A diffuser according to claim 13, wherein the fuel injectors are cylindrical.

15. A diffuser according to claim 1, wherein the separator is disposed centrally between the inner and outer walls of the diffuser.

16. A diffuser for a single-head annular combustion chamber, the diffuser comprising:
   a separator configured to split the flow of air leaving a compressor into two annular diffusion streams, the separator being formed by a single flat thin sheet connected by structural arms to inner and outer circularly-symmetrical walls of the diffuser,
   wherein a diffuser angle of each diffusion stream defined between said thin sheet in the diffuser and the inner and outer walls of the diffuser is about 12 degrees to 13 degrees, and
   wherein a total diffuser angle defined by the inner and outer walls of the diffuser is substantially equal to the sum of the diffuser angles of the diffusion streams, and
   wherein both annular diffusion streams exiting from the diffuser feed a single row of fuel injectors which are disposed on an extension of a surface defined by a downstream end portion of the separator and which are oriented relative to the longitudinal axis of the single-head annular combustion chamber substantially in the same manner as said downstream end portion of the separator,
   wherein each fuel injector includes a central axis, and said central axis intersects the downstream end portion of the separator.

17. A diffuser for a single-head annular combustion chamber, the diffuser comprising:
   a separator configured to split the flow of air leaving a compressor into two annular diffusion streams, the separator being formed by a thin sheet connected by structural arms to inner and outer circularly-symmetrical walls of the diffuser,
   wherein a diffuser angle of each diffusion stream defined between said thin sheet in the diffuser and the inner and outer walls of the diffuser is about 12 degrees to 13 degrees, and
   wherein both annular diffusion streams exiting from the diffuser feed a single row of fuel injectors which are disposed on an extension of the surface defined by a downstream end portion of the separator and which are oriented relative to the longitudinal axis of the combustion chamber substantially in the same manner as said downstream end portion of the separator,
   wherein each fuel injector includes a central axis, and said central axis intersects the downstream end portion of the separator, and
   wherein the thin sheet includes a tip at its downstream end, having holes formed therein and extending upstream to open out alternately in each of the faces of the thin sheet in order to balance pressures on either side of the separator and at the tip.

* * * * *

UNITED STATES PATENT AND TRADEMARK OFFICE
CERTIFICATE OF CORRECTION

PATENT NO. : 7,707,834 B2
APPLICATION NO. : 11/315360
DATED : May 4, 2010
INVENTOR(S) : Alain Cayre et al.

Page 1 of 1

It is certified that error appears in the above-identified patent and that said Letters Patent is hereby corrected as shown below:

Column 3, line 25, change "axis $A_{F1}$, are in line" to --axis $A_{F1}$, and are in line--.

Signed and Sealed this

Third Day of August, 2010

David J. Kappos
*Director of the United States Patent and Trademark Office*